United States Patent
Yach

(10) Patent No.: US 8,983,500 B2
(45) Date of Patent: Mar. 17, 2015

(54) MAPPING AN EVENT LOCATION VIA A CALENDAR APPLICATION

(75) Inventor: David Yach, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1021 days.

(21) Appl. No.: 11/832,180

(22) Filed: Aug. 1, 2007

(65) Prior Publication Data

US 2009/0036148 A1    Feb. 5, 2009

(51) Int. Cl.
*H04W 24/00* (2009.01)
*H04M 1/725* (2006.01)
*G06Q 10/10* (2012.01)
*H04W 4/02* (2009.01)
*H04L 29/08* (2006.01)

(52) U.S. Cl.
CPC ......... *H04M 1/72566* (2013.01); *G06Q 10/109* (2013.01); *H04W 4/02* (2013.01); *H04L 67/18* (2013.01); *H04M 1/72572* (2013.01); *H04M 2250/10* (2013.01)
USPC .................. 455/456.3; 455/456.5; 455/456.1; 455/414.1; 455/418; 455/412.2; 709/203; 709/242; 705/7.19; 705/7.18; 705/7.13; 705/14.25

(58) Field of Classification Search
CPC . G06Q 10/109; G06Q 10/10; G06Q 10/1093; G06Q 10/107; G06Q 10/1095; G06Q 50/188; G06Q 10/06311; G06Q 10/06314; G06Q 10/063116; H04M 1/72566; H04M 1/72572; H04W 4/02; H04W 52/0258; H04W 4/00; H04W 4/12; Y10S 707/951; Y10S 707/99943; Y10S 715/963; G06F 17/30041
USPC ........ 455/456.3, 456.1, 414.1, 418; 705/7.19, 705/7.18, 7.13, 14.25, 7.24; 709/203, 242
See application file for complete search history.

(56) References Cited

U.S. PATENT DOCUMENTS

| | | | |
|---|---|---|---|
| 5,598,183 A * | 1/1997 | Robertson et al. | 715/856 |
| 6,920,328 B2 | 7/2005 | Wollrab | |
| 2002/0030698 A1 | 3/2002 | Baur et al. | |
| 2002/0091568 A1 | 7/2002 | Kraft et al. | |
| 2003/0018521 A1 | 1/2003 | Kraft et al. | |
| 2007/0060108 A1* | 3/2007 | East et al. | 455/414.1 |
| 2007/0067773 A1* | 3/2007 | Hope et al. | 718/100 |
| 2008/0235084 A1* | 9/2008 | Quoc et al. | 705/14 |
| 2008/0301144 A1* | 12/2008 | Boss et al. | 707/10 |
| 2009/0013008 A1* | 1/2009 | Asano et al. | 707/202 |

FOREIGN PATENT DOCUMENTS

| | | |
|---|---|---|
| WO | 2007040646 | 4/2007 |
| WO | 2007040646 A1 | 4/2007 |

OTHER PUBLICATIONS

Microsoft Outlook.*

(Continued)

*Primary Examiner* — Fred Casca
(74) *Attorney, Agent, or Firm* — Ridout and Maybee LLP

(57) ABSTRACT

A method of mapping a location of an event that is scheduled in a calendar application includes steps of identifying a contact associated with the event, determining address information associated with the contact, obtaining map data for the address information, and generating a map of the location associated with the contact based on the map data. Meeting or event locations can thus be mapped even if there is no event location or address information specified directly in the meeting request or appointment.

22 Claims, 6 Drawing Sheets

(56) References Cited

OTHER PUBLICATIONS

Mircosoft Outlook 2003 intro.*

"Extracting Semantic Location from Outdoor Positioning Systems"; Juhong Liu et al., Mobile Data Management, 2006. MDM 2006. 7th International Conference on Nara, Japan May 10-12, 2006, Piscataway, NJ USA, IEEE, May 10, 2006, pp. 73-80, XP010917947, ISBN: 0-7695-2526-1.

"Location-based Services in Internet Telephony" Xiaotao Wu et al.; Consumer Communications and Networking Conference, 2005. CCNC.2005 Second IEEE Las Vegas, NV, USA Jan. 3-6, 2005, Piscataway, NJ, USA, IEEE, Jan. 3, 2005, pp. 331-336, XP010787659, ISBN 0-7803-8784-8.

European Search Report for EP 07 11 3650, mail Dec. 28, 2007.

European Patent Office, "Communication pursuant to Article 94(3) EPC", dated Aug. 10, 2010.

Norton Rose Canada LLP, "Response to Examiner's Requisition" for corresponding Canadian Patent Application No. 2,687,036 dated Oct. 31, 2012, Canada.

Smith, Leah—Canadian Intellectual Property Office, "Examiner's Requisition" for corresponding Canadian Patent Application No. 2,687,036, dated May 23, 2012, Canada.

Canadian Intellectual Property Office, Examiner's Requisition Dated Nov. 7, 2013, issued in Canadian Patent Application No. 2,687,036.

* cited by examiner

MAPPING AN EVENT LOCATION VIA A CALENDAR APPLICATION

CROSS-REFERENCE TO RELATED APPLICATIONS

This is the first application filed for the present invention.

TECHNICAL FIELD

The present disclosure relates generally to wireless communications devices and, in particular, to wireless communications devices having calendaring, scheduling, agenda or date-book functionalities.

BACKGROUND

Calendar applications (also known as scheduling, agenda or date-book applications), such as the "Calendar" module of the ever-popular Microsoft® Office Outlook®, enable users to schedule events, such as appointments or meetings. Calendar applications provide myriad useful functionalities that allow users to manage their time effectively, such as providing reminders for upcoming events, enabling the setting of recurring events, sharing date-book information with other users to facilitate the selection of mutually agreeable times for meetings, etc.

When scheduling a meeting, for example, a meeting request (e.g. "New Meeting Request" in Outlook®) is sent with event information such as, for example, the subject or purpose of the meeting, its start time, duration and location. Occasionally, however, the location of the meeting is not a place that is familiar to the user, in which case the user can download a map of the meeting location using any web-based mapping application such as Google Maps™ or MapQuest™.

For a user operating a calendar application on a wireless communications device, it is handy to be able to map the location of the meeting or event from within the calendar application. Such a technique is described in WO 2007/040646, a published PCT application belonging to Sony Ericsson Mobile Communications AB. The Sony Ericsson technology enables the user of the wireless device to request a map showing the location of the event. If the device is also GPS-enabled, then the device enables the user to obtain directions from the current location of the device to the event location. However, the Sony Ericcson technology only works if the event location has been specified in the calendar. In other words, if the meeting request, appointment or other event does not contain address information for the location of the event, then the calendar application cannot supply this information to the map server to download the map of the event location. In an increasingly fast-paced world, it often occurs that the person sending a meeting request or scheduling an event fails to specify enough address information to enable the wireless device to directly obtain a map of the event location. Therefore, an improvement to this prior-art technology would be highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology generally provides a method, wireless communications device and computer program product that enable a user of a calendar application to map a location of an event (e.g. appointment, meeting, etc.) that is stored in the calendar application. Mapping of the event location is based on address information obtained for a contact associated with the event, i.e. a person who has been invited (an "invitee") or a person who has requested the occurrence of the event (the inviting party). This technique therefore enables mapping of the event location even if the event location is not directly specified in the meeting request or appointment. In other words, in certain circumstances, the address information of a contact can be used as a proxy for the event location (on the assumption that the event is to occur at the work or home address of one of the contacts associated with the event).

Accordingly, an aspect of the present technology is a method of determining a location of an event that is scheduled in a calendar application. The method includes steps of identifying a contact associated with the event, determining location information associated with the contact, and presenting the location information to a user of the calendar application as indicative of the location of the event. The location information may be address information stored in an address book accessible by the calendar application. The method may further include steps of obtaining map data for the address information and generating a map of the location associated with the contact based on the map data.

Another aspect of the present technology is a computer program product that includes code adapted to perform the steps of the foregoing method when the computer program product is loaded into memory and executed on a processor of a wireless communications device.

Yet another aspect of the present technology is a wireless communications device for obtaining and presenting location information about a location of a calendar event. The wireless communications device includes a memory and a processor for storing and executing a calendar application that stores an event, the calendar application identifying a contact associated with the event. The wireless communications device also includes a display for displaying location information associated with the contact as being indicative of the location of the calendar event.

The details and particulars of these aspects of the technology will now be described below, by way of example, with reference to the attached drawings.

Figure 1:
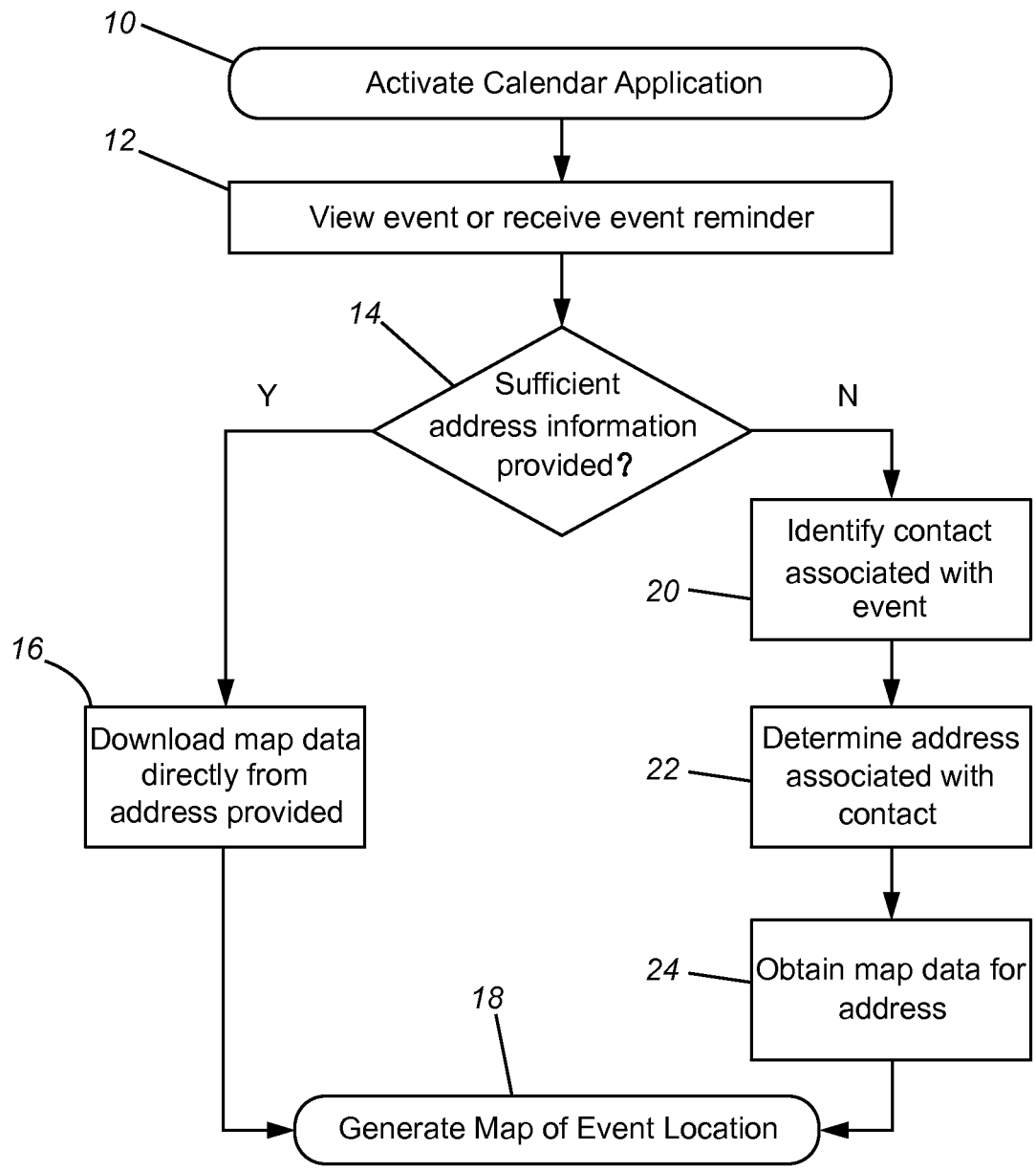
FIG. 1 is a flowchart outlining steps of a method of mapping an event location using address information of a contact associated with the event.

FIG. 1 is a flowchart outlining steps of a method of mapping an event location using address information of a contact associated with the event. After a calendar application is activated or instantiated (step 10) and an event or event reminder is viewed (step 12), a decision is made (at step 14) as to whether sufficient address information is provided in the event description or event information to directly enable the downloading of map data. If sufficient address information is provided, map data can be downloaded directly based on the address information provided (step 16), as is known in the art, e.g. as per the prior-art technique described in WO 2007/040646, in order to enable the device to generate a map of the event location (step 18). If no address information is provided (or the address information is insufficient), Applicant's new technology can be employed to extract relevant address information from one or more contacts invited to the event. This new method of mapping a location of an event scheduled in a calendar application is commenced at step 20 by identifying a contact associated with the event. A contact is a person for whom contact information is available either locally or remotely, such as a person for whom address information is stored in an address book or contact list. Being "associated" with an event means that the contact is either the person requesting the meeting or initiating the appointment (i.e. instigating or creating the event, whatever that event might be) or, alternatively, the contact has been invited to attend the event, i.e. the contact is one of the invitees. Being "associated" can also include contacts who are auditing or monitoring the event, or persons who are designated as a resource person for the event. A contact can also be an entity other than a person (i.e. a contact can be artificially defined to be a building, a conference room, etc. to which an e-mail address and address information are assigned). For example, in a global address list (GAL), a building mailbox or a conference room mailbox may be listed as "contacts", each with their own e-mail address and street address. These non-person "contacts" can be configured to automatically reply to e-mail queries regarding their availability (e.g. is the conference room available or not at a given time, or is the building accessible or not).

Subsequently, at step 22, the method entails determining location information (e.g. address information or alternatively longitude and latitude coordinates unconnected to an actual street address) that is associated with the contact. This can be accomplished by looking up the contact's address information in an address book stored on the device or by wirelessly accessing a server or other remote storage medium on which contact address information may be maintained and updated (e.g. a corporate directory). In some instances, a contact's location information may be expressed in terms of longitude and latitude coordinates that do not have an actual address associated therewith. This may be the case where a person's cottage is located off a publicly named road, in which case there is no street address available for the contact's cottage. (Another example would be a meeting point for a group of mountain biking enthusiasts. If their weekly rendezvous is on the side of a mountain, for which no street address exists, GPS coordinates can be stipulated as the "location information".) If address information (or longitude/latitude location information) cannot be determined for a given contact, then the calendar application can notify the user that locations for that particular contact are indeterminate. The user might then be queried as to whether he or she wishes to cancel the map request, try again with a different contact, or e-mail the contact or the party who has set up the event to request that a map link or address information be provided by return e-mail.

Once location information (e.g. address information) has been determined, the next step in this method, in general terms, is presenting the location information to a user of the calendar application as indicative of the location of the event. In other words, the address, a map thereof, or route directions (or a combination thereof) can be presented to the user. An indication can also be provided to the user that the location of the contact is being used as a proxy for the location of the event. In other words, the location of a chosen contact represents the probable location of the event and is therefore merely "indicative" of the event location.

The method, as presented in FIG. 1, may then include a step of obtaining map data for the address information (step 24). For the purposes of this specification, "obtaining map data" means receiving or downloading the map data over the air, i.e. over a wireless link, retrieving the map data from a local cache, or downloading the map data over a wired connection, or any combination thereof. In other words, obtaining map data may include steps of determining whether the data is already cached locally and, if the data is indeed locally cached, retrieving it from the cache. Otherwise, if not all of the map data is cached, then the map data is downloaded over the air.

Once the map data has been obtained, the method may entail a "final" step (step 18) of generating a map of the location associated with the contact based on the map data. Generating the map may involves rendering the map data onscreen with a marker, arrow, icon or other symbol indicative of the location being sought.

As should be apparent from the foregoing, this method enables mapping of a location even if no address information is provided directly in the event description (i.e. either no address is specified in the meeting request/appointment or insufficient address information is present to enable the downloading of map data). FIG. 1 presents both branches of steps (branch 1 via step 16 and branch 2 via steps 20, 22 and 24) in order to underscore that the present technology can deal with both scenarios. In other words, the method may entail a decisional step 14 in which a decision is made whether sufficient address information is contained directly within the meeting request or appointment to enable map data to be downloaded.

In one implementation, the method may further include steps of displaying a list of all contacts associated with the event and then enabling a user to select one of the contacts for determining a map of the location associated with the contact selected by the user. Consider, by way of example only, a situation where Kate has invited Dave and Ella to a meeting at her office. Assuming, again by way of example only, that Ella is unfamiliar with the location of Kate's office and that the meeting request did not provide a map link or address for Kate's office. In that scenario, the calendar application might display a list of the other attendees, namely Kate and Dave. The calendar application would then enable Ella to select one of the two attendees at the contact whose address is relevant. Upon selection of "Kate", the calendar application would retrieve address information about Kate from Ella's address book and then download map data for the location of Kate's office based on the address retrieved from Ella's address book.

In a variant on this implementation, the step of enabling the user to select one of the contacts may include steps of displaying a plurality of addresses associated with the selected contact and enabling the user to select one of the plurality of addresses associated with the contact. Consider, again by way of example, the same scenario as presented in the preceding paragraph but where Ella's address book contains both a home address and a work address for Kate. In this case, both home and work addresses for Kate would be displayed to enable Ella, based on the context of the event, to select which of the two addresses for Kate is the appropriate one for mapping. Of course, a given contact may have multiple addresses, not just home address and work address. For example, a contact may have a primary work address, a secondary work address (e.g. a satellite office), a primary residential (main home address) and a secondary residential address (e.g. vacation home). In such a case, each of the multiple address can be displayed to enable the user to manually pick the one that corresponds to the event in question.

In another variant on this implementation, the method may further include a step of configuring the calendar application to automatically select a work address associated with the contact if an event time lies within specified work hours and to automatically select a home address associated with the contact if the event time lies outside specified work hours. With reference still to the (evolving) example presented in the two preceding paragraphs, a further refinement to the method entails configuring Ella's calendar application to automatically select Kate's home address if the time of the event is outside regular (or specified) work hours and to automatically select Kate's work address if the event is within regular (or specified) work hours.

Configuring of the calendar application may be done by the user (e.g. Ella) or by a systems administrator. Configuring the calendar application can be done by changing options, settings or preferences to define times of day (and night) when the work address is the likely candidate for the an event location or when, conversely, the home address is likely to be the location for the event. In like manner, time parameters can be defined for each one of the plurality of addresses associated with those contacts who have more than two addresses associated therewith. Since this feature is predicated on assumptions and probabilities that certain addresses are the in fact the actual location of the event, the calendar application can be configured to display the assumed selection or choice to thus enable the user to manually override the assumed selection. For example, returning again to the scenario involving Ella and Kate, assume that Kate has set up an event involving Ella at 7 p.m., a time clearly outside regular work hours (or outside the business hours specified by Ella and/or Kate). Ella's calendar application would, if configured to enable this feature, presume that the event is not work-related and would assume that the event is to be located at Kate's home address. Ella's calendar application would display the tentative selection of Kate's home address as the event location, providing Ella with an opportunity to manually override this presumed location, if she has reason to believe that the assumption is incorrect.

In another implementation, the method may further include steps of determining a current location of a wireless communications device and generating route directions from the current location of the device to the location associated with the contact. Determining the current location of the wireless communications device can be accomplished most expeditiously using a GPS receiver. The GPS receiver can be a GPS chipset embedded within the device or alternatively an external Bluetooth™-enabled GPS puck linked to the device. In addition to providing route directions, an estimated travel time or transit time can be provided. As a further refinement, the device can calculate, while operating in the background, the travel time to each of the possible locations of each upcoming event (i.e. each of the attendees' addresses) and then adjust the first event reminder for that event to be triggered no later than the travel time estimated to get to the furthest of all the potential locations of the event. Returning to the foregoing example involving Kate and Ella, if the distance to Kate's home address is 5 km with an estimated travel time of 5 minutes by car and the distance to Kate's work address is 10 km with an estimated travel time of 10 minutes by car, the Ella's device would trigger the first event reminder at least 10 minutes before the event. Preferably, though, the event reminder would provide fifteen minutes of grace period plus the travel time, thus providing the event reminder 25 minutes beforehand. That way, even if the event turns out to be located at the further of the two locations, Ella will have enough time to get there for the event. Travel times and distances can be determined between two static addresses or between a current location (GPS determined) and a static address.

In yet another implementation, the method may further include a step of configuring the calendar application to automatically select the contact who has invited the user to the event. In many instances, the party sending out the meeting request or scheduling the event is the host of the event or meeting, in which case the location of the event is the inviting party's address. The calendar application can be configured to make this assumption. Again, since this is merely an assumption, an opportunity to override this assumption should be provided to the user.

In a further implementation, the method may also include a step of configuring the calendar application to automatically select the contact whose location was previously used for a recurring event. For a recurring event, such as, for example, a weekly or monthly meeting, the calendar application can be configured or preset to automatically select the contact whose location was previously used. To implement this feature, the calendar application tracks (or stores) the location selected for a previous event (or events) for which the "recurring event" feature is used. Examples of a "recurring event" feature are found in MS Outlook® as the "New Recurring Meeting" and "New Recurring Appointment" features.

Alternatively, the notion of looking to prior events for intelligence on the likely location of the subsequent event can be applied to related events having a common time and day, a common group of attendees, or a common subject line even if the "recurring event" feature is not explicitly used. Thus, for example, if Kate's meeting request to Ella and Dave was a recurring event for a weekly meeting of the "book club" (the recurring subject line) at seven p.m. every Wednesday (the recurring time and day), then the calendar application would store the location selected by Ella for the first such event and propagate that location information to all of the recurring or related events. Even if Kate does not use the recurring event feature but instead sends a number of independent meeting requests, the calendar application could be configured to look for patterns or commonalities. If a number of meetings, appointments or other events are scheduled for seven p.m. on Wednesdays, the application could infer that the events are related and hence the location of the first meeting is stored as being potentially useful in determining the location of subsequent, related events. Similarly, if the a number of events have the same subject (e.g. "Meeting of the book club") then an inference may be drawn that the events are located at the same place, in which case the device can stored the location of the first event once this has been determined and this location information pan then be propagated to the related events.

As a further refinement, the GPS receiver can be used to determine the position of the user at a time corresponding to the event in order to verify that the assumed location is indeed the correct location for the event. For example, if Ella assumes that Kate's home address is the correct location for the event and travels to Kate's home address, the device will monitor Ella's position. If, at the appointed time, e.g. seven p.m., Ella is indeed at that position and remains at that position for a substantial portion of the allotted duration of the event (without straying beyond a reasonable positional tolerance) then the device will infer that Ella's assumption about the location of the event was indeed correct. The device will then store this "verified" location as the correct event location and propagate this "verified" location information to all other recurring events or related events (i.e. events related by time slot and day, subject, commonality of attendees, etc).

In yet a further implementation, the method may further include a step of configuring the calendar application to automatically select the contact whose location was previously used for a previous event attended by the same set (or a subset) of contacts. Assume, by way of example, that Amy had invited Bob, Caroline, John and Mary to a meeting last week. If Bob receives another meeting request from Amy involving also Caroline, John and Mary, then the device may infer that this meeting is related to the previous meeting in which case the calendar application will assume that the contact whose location was used for the last meeting is the same contact whose location should be used for this meeting.

In yet a further implementation, the location of a previous event having related attributes (same invitees, same subject, a "recurring event", etc.) can be used to determine the probable location of the next ("related") event. This can be done by determining a current location of a wireless communications device on which the calendar application is executing at a time corresponding to the event and associating the current location of the event with a future event having related attributes in order to enable the calendar application to predict a probable location of the future event. For example, GPS technology on the wireless device can enable the device to track where the previous "related" meeting took place (by noting or tracking the position at the time allocated for the meeting) and associating this location event with other related event locations. Alternatively, the device can store a first event location and attempt to correlate the position coordinates with an address stored for one of the contacts in an address book, to thus deduce which contact is "hosting" the event. In one particular implementation, the device would take a number of GPS position fixes during the time slot allotted for the duration of the meeting (e.g. every five minutes for an hour if the event is scheduled to last 1 hour). The device then determines whether the user has been approximately in the same location for the past hour. If so, the device makes a preliminary inference that the user is probably attending the event (appointment or meeting). To verify this preliminary inference, an average position is then computed from the set of GPS position fixes. The GPS coordinates (longitude and latitude) are then correlated to addresses stored in the address book of the user's device. To facilitate this task, each address can be pre-converted into longitude and latitude coordinates and each coordinate is assigned a tolerance. If the average GPS position fix is within the tolerance of any of the stored addresses, a match is declared and the address is verified as being the correct location for the event.

Alternatively, if the user tentatively selects a location to be mapped, the coordinates of longitude and latitude for that address can be used, i.e. the device can simply determine whether it is within a distance or tolerance of the selected/ assumed address for more than a predetermined amount of time, e.g. more than 50% of the duration of the event which probably means that the user has arrived at the presumed location and has decided to remain there because the assumed location turned out to be correct. If the user discovers the assumed location is actually incorrect and departs for another location, then short duration of the user at the first location is insufficient to be treated as a verification of the event location. This first event location is thus discarded. If no GPS match is ever obtained, the device assumes that the user was not at the event, or at least not for the sufficient duration, and discards the data, thereby making no assumptions for any of the related events.

If the device had determined that the previous meeting involving Amy, Bob, Caroline, John and Mary was held at Caroline's office, then the device, if so configured, presumes that the next meeting is likely to be at Caroline's office as well. This assumption is then displayed to Bob (the user of the device), providing Bob the opportunity to manually override the assumption made by the device.

The new technology can be further refined by integrating artificial intelligence that looks for the context of a given event or meeting request to make logical inferences or deductions based on whatever information is provided with the meeting request or appointment. For example, it is possible to extract the context (using an AI) for a meeting request that simply read: "Dinner at Bob's". An AI module in the calendar application could search the names of all the invitees for a contact called "Bob" or "Bobby" or "Rob" or "Robert". If such a contact exists, then the contacts list/address book is searched to determine if there is an entry providing an address. The AI module would then infer that the proper location of the event (the dinner at Bob's) is at that contact's location. The AI could also look at the time of the event (as described above) to further choose between Bob's work address and his home address. In addition, the AI module could look at key words in the subject line. A word like "dinner" naturally suggests a home address more than a work address. The AI module could combine any of these inferences with the sort of analyses described earlier, such as inferring a location from the prior location of a similarly timed meeting.

Figure 2:
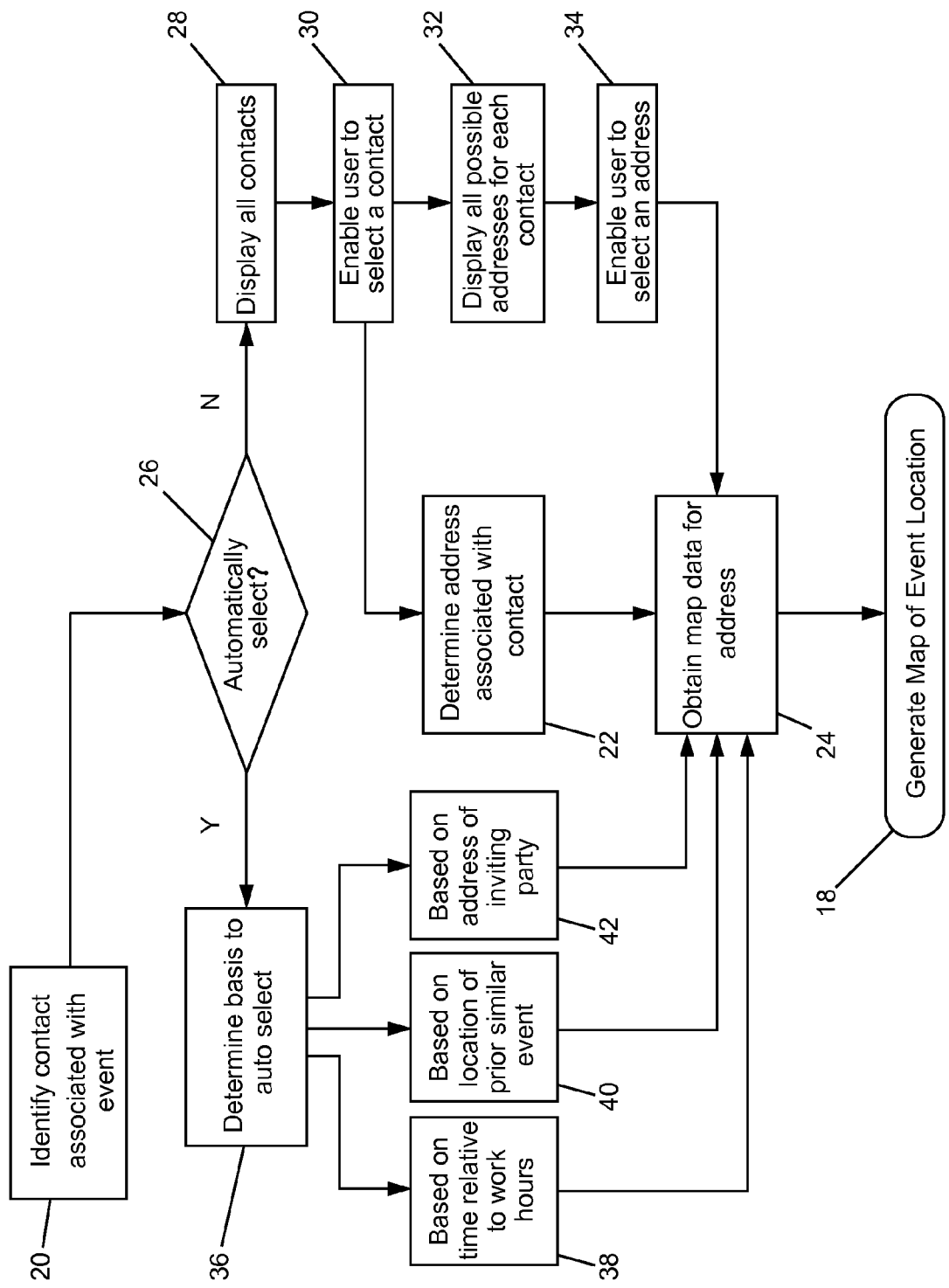
FIG. 2 is a flowchart outlining steps of identifying a contact associated with an event for the purposes of generating a map of the location of the event.

Some of the foregoing implementations and variants are summarized in the flowchart of FIG. 2 which illustrates in general terms some of the ways to identify a contact associated with an event for the purposes of generating a map of the location of the event. The flowchart of FIG. 2 takes as its starting point step 20 from FIG. 1 which the step of identifying a contact associated with the event. At this point, the device decides at step 26 whether the selection of the appropriate contact and the appropriate address for the selected contact (if the contact has more than one address) is to be done automatically or manually. If the selection is not to be automatic (i.e. it is to be manual), then the device displays all contacts associated with the event (step 28) and enables the user to select one of the contacts as being the one whose address is to serve as a proxy for the event location (step 30). If there is only one address for the chosen contact, operations proceed to step 22 (determining the address based on the contact identified). If there is more than one address for the contact selected (e.g. work and home addresses stored in the contacts list or address book) then the device displays all possible addresses for the chosen contact (step 32) and then enables the user to select one of the addresses (step 34). Thereafter, operations proceed as per usual to step 24 to obtain map data for the address in order to generate the map (step 18).

As further depicted in FIG. 2, if selection of the address is to be done automatically, then the device determines the basis upon which auto-selection is to be performed (at step 36).

Usually, this step entails consulting configuration of the calendar application to determine what settings or preferences have been enabled. Three exemplary auto-selection criteria are provided in this figure merely by way of example: auto-selection based on the time of the event relative to specified, predetermined or implied work hours (step 38); auto-selection based on a prior similar meeting or event with related attributes (step 40), i.e. a meeting or event that had similar attendees, similar time and day, similar subject line, or any other such recognizable similarity; or auto-selection based on the address of the inviting party (step 42). In each case, as mentioned above, the address determined using auto-selection can be manually overridden by the user. Once the address is determined, operations move to step 24 in which map data is obtained in order to enable the device to generate a map onscreen (step 18).

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

This novel method is preferably implemented on a wireless communications device such as the BlackBerry® by Research in Motion Limited (or on other wireless handhelds, cellular phones, wireless-enabled laptops or wireless-enabled PDAs) If the method is implemented on a GPS-enabled device, then directions can also be provided from the GPS-determined current location of the device to the location of the attendee, invitee or event.

Figure 3:
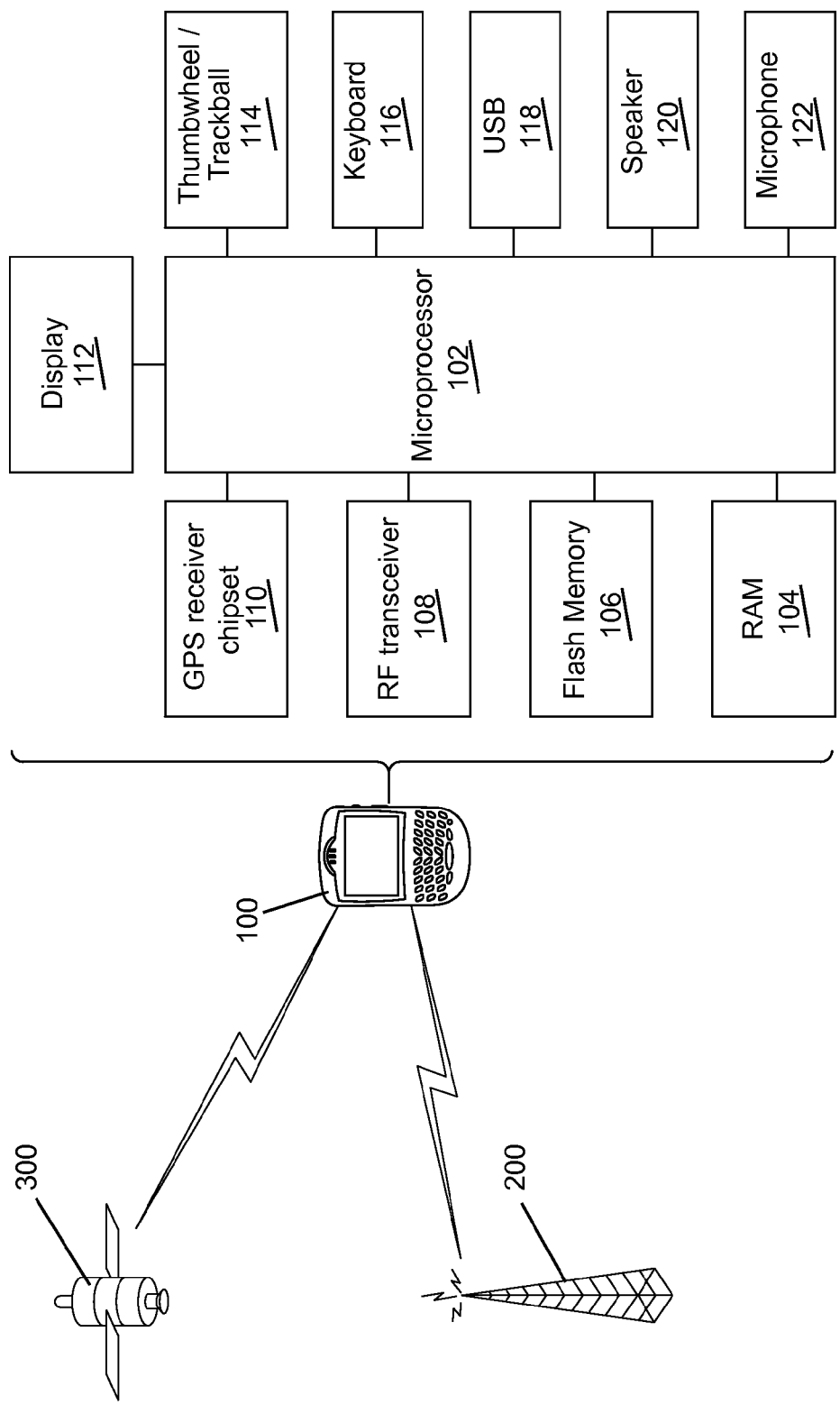
FIG. 3 is a block diagram of key components of a GPS-enabled wireless communications device on which the present technology can be implemented.

FIG. 3 is a block diagram depicting certain key components of a wireless communications device 100. It should be expressly understood that this figures is intentionally simplified to show only certain components; the device 100 of course includes other components beyond what are shown in FIG. 3. The device 100 includes a microprocessor 102 (or simply a "processor") which interacts with memory in the form of RAM 104 and flash memory 106, as is well known in the art. The device 100 includes an RF transceiver 108 for communicating wirelessly with one or more base stations 200. The device 100 includes a GPS receiver chipset 110 for receiving GPS radio signals transmitted from one or more orbiting GPS satellites 300. In terms of input/output devices or user interfaces, the device 100 typically includes a display 112 (e.g. a small LCD screen), a thumbwheel and/or trackball 114, a keyboard 116, a USB 118 or serial port for connecting to peripheral equipment, a speaker 120 and a microphone 122. The processor and memory thus enable a calendar application and a map application to run on the wireless device. The map application can interact with the GPS receiver 110 by mapping the GPS-determined position coordinates for the device so as to graphically display the device's current location, as is known in the art. The calendar application runs on the device and, depending on the nature of the calendar application, may be "auto-instantiating" when reminders come up, i.e. the operating system of the device may automatically instantiate a dormant calendar application in order to sound an alarm or provide a reminder for an upcoming event.

Figure 4:
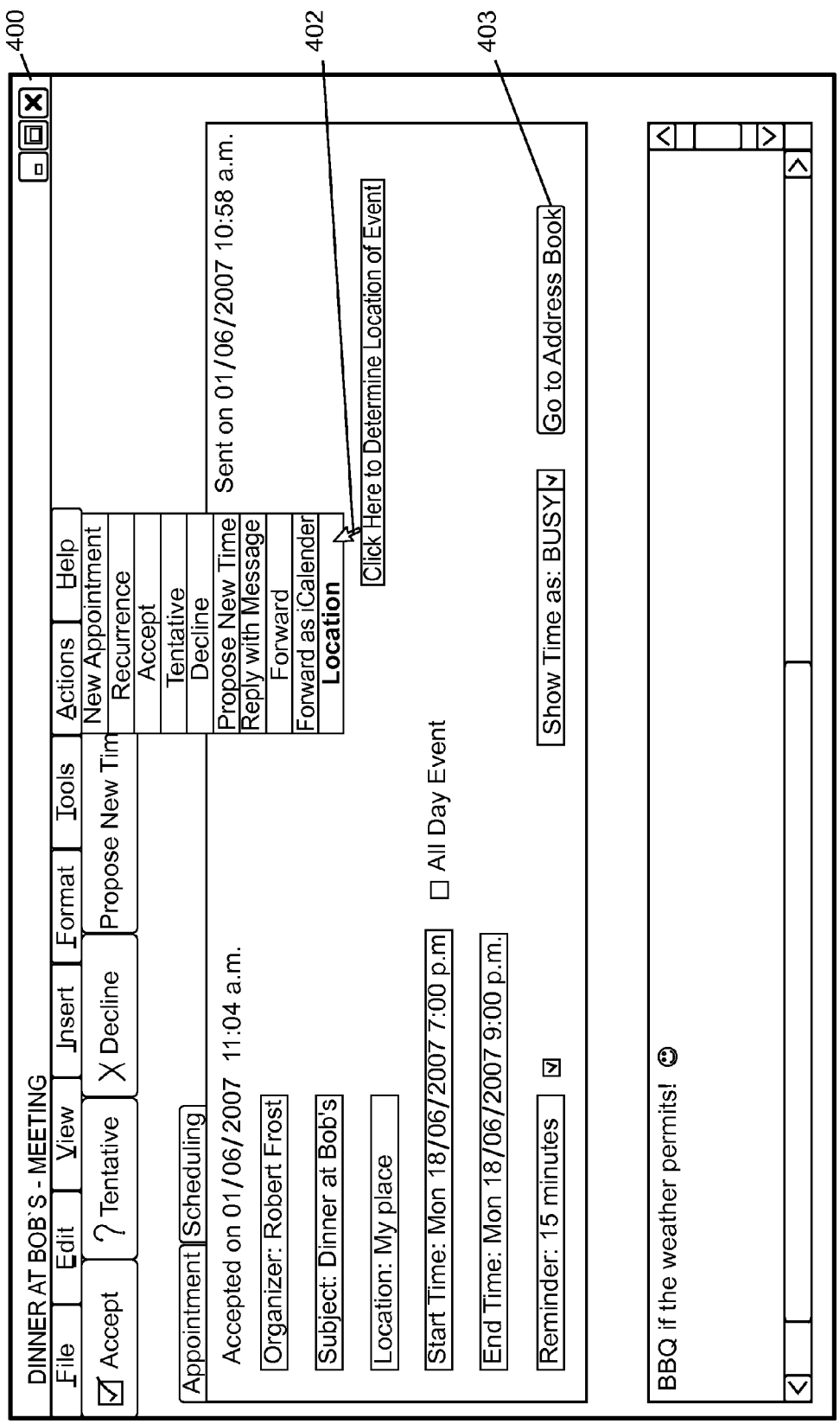
FIG. 4 is an example of a user interface of a calendar application implementing the present technology.
Figure 5:
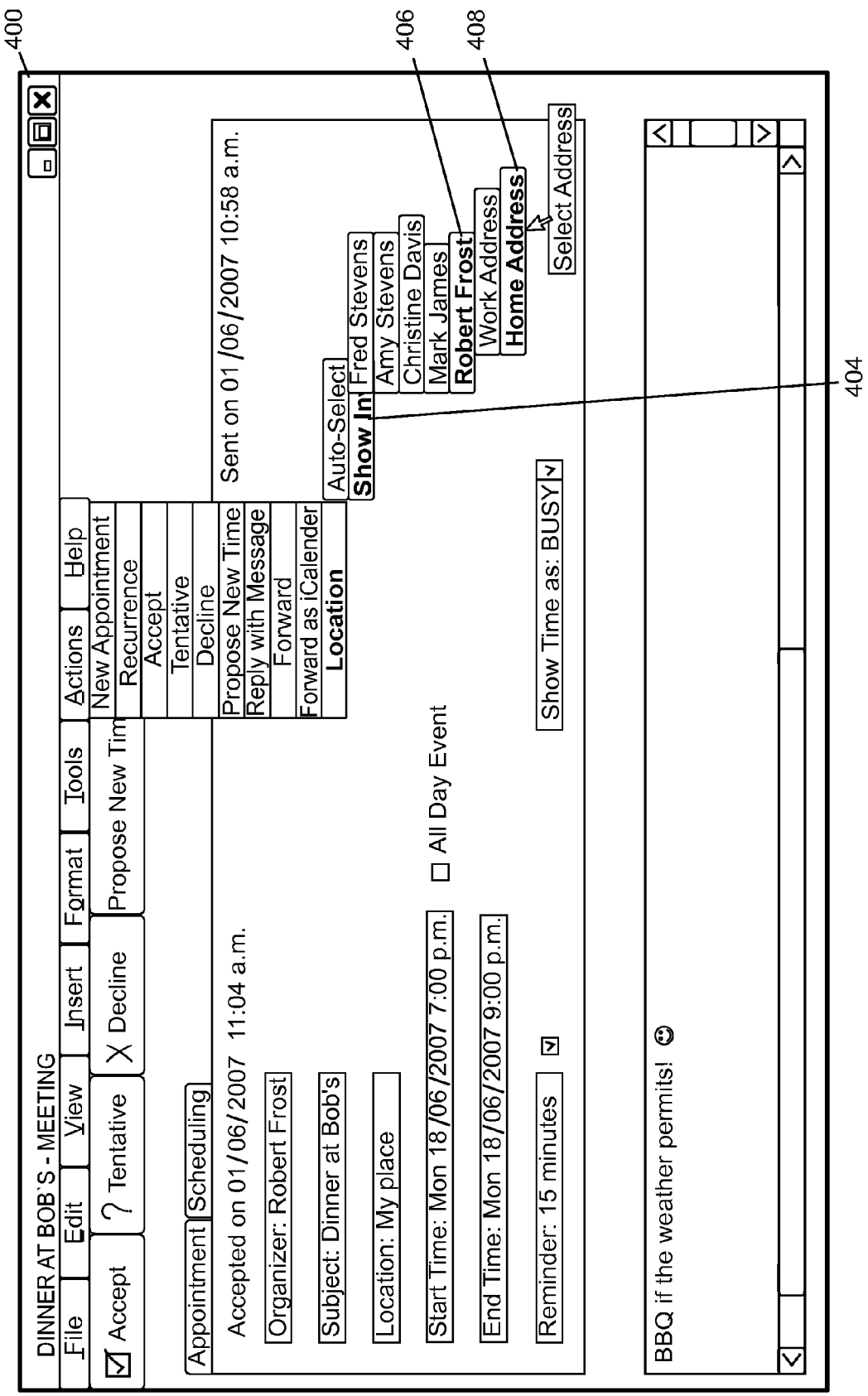
FIG. 5 is an example of a user interface of a calendar application implementing the present technology, showing various options available to determine the location of an event.
Figure 6:
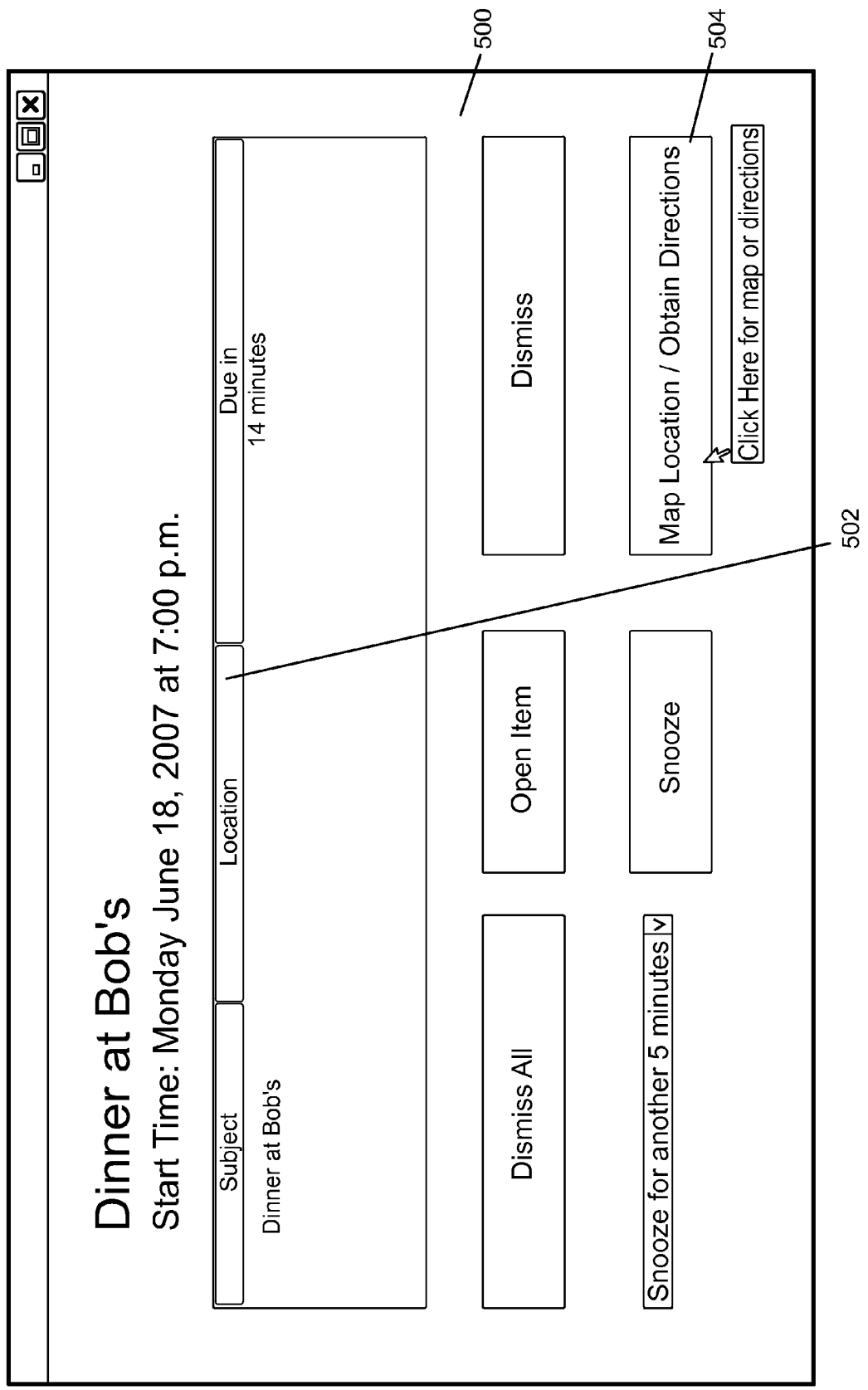
FIG. 6 is an example of a pop-up reminder box, which can be triggered by a calendar application, in which a user may request a map of, or route directions to, the location of the event for which the reminder has been triggered.

FIGS. 4 to 6 present some examples of user interfaces for a calendar application incorporating this new technology for determining a map location or obtaining route directions to an event location even if such information is not specified directly in the meeting request or appointment. As depicted by way of example in a calendar application user interface 400 shown in FIG. 4, this new technology provides a "Location" item that has been added to the drop-down menu, in this particular case to the "Actions" menu. By selecting the "Location" item, the calendar application will attempt to determine the location of the event based on the addresses of the contacts associated with the event. In this case, the inviting party or organizer ("Robert Frost" in this example) has only specified "My place" as the location of the event ("Dinner at Bob's"), having omitted his address.

As depicted in FIG. 5, the user faced with the situation depicted in FIG. 4 (i.e. who does not know what Bob's address is), can either manually select or auto-select the relevant address for the purposes of determining the event location. In this particular example, the user manually selects the option "Show Attendees" (404) and then picks (406) the contact that is most appropriate (in this case "Robert Frost", presumably also known as "Bob"). If the contacts list or address book of the user contains more than address for Bob (Robert Frost), then each of these different addresses are displayed to enable the user to pick (408) the most relevant one, in this case the home address since the user knows from the context of the event that it is a barbecue dinner.

Alternatively, or in addition to the implementations described in the foregoing paragraphs, the calendar application user interface 400, such as the ones shown in FIGS. 4-5, can provide a menu item or button 403 to enable the user to go to the user's address book to select another contact to be used as a "proxy" for one of the contacts actually attending or to select one of the listed contact's address information as the location of the event. For example, the user may know or realize that the attendees do not have complete address information in his address book and that another contact works or lives at the same place that is believed to be the event location. In that case, the user would enter or link to the address book and select the contact whose address information is complete and whose address information is believed to correspond properly with the event location. As another example, if the user knows that none of the contacts attending have address information related to the event location, then the user can link directly into the address book to search for another contact whose address information would be relevant. For example, this would be the case for a surprise party where an email would be circulated by the inviting party to the invitees but the proper location of the party might be at the home of the person for whom the party is being held. In that case, the user would want to go directly into the address book and look for address information for the person for whom the party is being held. The button 403 (e.g. "Go to Address Book") enabling the user to enter the address book can be located on the interface 400, as depicted in FIG. 4, or, as another example, it can be provided as a menu item within one of the drop-down menus of the calendar application.

FIG. 6 depicts a reminder window or dialog box that pops up on the user's display screen (graphical user interface) at a predetermined time before the event is schedule to take place. In this case, a reminder 500 for the event contains no location information in the location information field 502. Accordingly, the reminder 500 provides a "Map Location/Obtain Directions" to enable the user to initiate one or more of the methods described above to download a map of the event location and/or to obtain directions to the event.

For each of the foregoing implementations and variants, a further optional feature may be introduced to have the calendar application remember if it has already obtained the map, route directions or address for the event. In other words, with this optional feature, the determination of location information for a contact associated with an event need only be done once provided the calendar application either saves or caches the location information for subsequent retrieval and presentation on a subsequent reminder or subsequent viewing of the meeting/appointment/event particulars.

This new technology has been described in terms of specific implementations and configurations which are intended to be exemplary only. The scope of the exclusive right sought by the Applicant is therefore intended to be limited solely by the appended claims.

The invention claimed is:

1. A method of suggesting a location of an event that is scheduled in a calendar application, where no location information is initially associated with the event in the calendar application, the method for execution by a processor of a wireless communications device, the method comprising steps of:
    displaying a list of all contacts associated with the event;
        providing an option to identify and select a contact from the list of all contacts for determining a map using contact location information, wherein the contact is associated with the event and is a person invited to the event or a person who is an inviter for the event;
        determining, from an address book, the contact location information associated with the contact, wherein the contact location information comprises address information for a work address and a home address associated with the contact, the address information being accessible by the calendar application for presenting as a suggested location of the event;
        automatically selecting, as the suggested location of the event, the work address associated with the contact when an event time of the event lies within specified work hours, and automatically selecting, as the suggested location of the event, the home address associated with the contact when the event time of the event lies outside the specified work hours;
    determining the map using the suggested location of the event; and
        presenting, on a display, the suggested location of the event.

2. The method as claimed in claim 1 further comprising steps of:
    obtaining map data for the address information; and
    generating a map using the contact location information, based on the map data.

3. The method as claimed in claim 2 further comprising steps of:
    determining a current location of a wireless communications device; and
    providing route directions from the current location of the device to the suggested location of the event.

4. The method as claimed in claim 2 further comprising a step of automatically identifying the contact who is the inviter for the event.

5. The method as claimed in claim 1 wherein the step of providing an option to select one of the contacts comprises steps of:
    displaying a plurality of addresses associated with the selected contact; and
    providing an option to select one of the plurality of addresses associated with the contact.

6. The method as claimed in claim 2 further comprising a step of automatically identifying the contact whose location was previously used for a recurring event.

7. The method as claimed in claim 2 further comprising a step of automatically identifying the contact whose location was previously used for a previous event attended by the same set or subset of contacts.

8. The method as claimed in claim 2 further comprising steps of:
    determining a current location of a wireless communications device on which the calendar application is executing, the current location being determined at a time corresponding to the event, and the current location of the device being determined to be a current location of the event; and
    associating the current location of the event with any future event having related attributes in order to enable prediction of a probable location of any future event having related attributes.

9. The method of claim 1 wherein the address information is stored in an address book accessible by the calendar application.

10. The method of claim 1 wherein the address information is accessed remotely.

11. A computer program product comprising a non-transitory computer readable storage medium including code which, when loaded into memory and executed on a processor of a wireless communications device, is adapted to cause the device to perform the steps of:
    displaying a list of all contacts associated with the event;
        providing an option to identify and select a contact from the list of all contacts for determining a map using contact location information, wherein the contact is associated with the event and is a person invited to the event or a person who is an inviter for the event:
        determining, from an address book, the contact location information associated with the contact, wherein the contact location information comprises address information for a work address and a home address associated with the contact, the address information being accessible by the calendar application for presenting as a suggested location of the event;
        automatically selecting, as the suggested location of the event, the work address associated with the contact when an event time of the event lies within specified work hours, and automatically selecting, as the suggested location of the event, the home address associated with the contact when the event time of the event lies outside the specified work hours;
    determining the map using the suggested location of the event; and
        presenting, on a display, the suggested location of the event.

12. The computer program product as claimed in claim 11 wherein the step of providing the option to select one of the contacts comprises steps of:
    displaying a plurality of addresses associated with the selected contact; and
    providing an option to select one of the plurality of addresses associated with the contact.

13. The computer program product as claimed in claim 11 wherein the code is adapted to further cause the device to perform a step of:
    determining a current location of a wireless communications device; and
    generating route directions from the current location of the device to the location associated with the contact.

14. The computer program product of claim 11 wherein the address information is stored in an address book accessible by the calendar application.

15. The computer program product of claim 11 wherein the address information is accessed remotely.

16. A wireless communications device for obtaining and presenting location information about a suggested location of a calendar event, where no location information is initially associated with the calendar event, the wireless communications device comprising:
- a memory and a processor for storing and executing a calendar application that stores an event, the processor being configured to:
- display a list of all contacts associated with the event;
- provide an option to identify and select a contact from the list of all contacts for determining a map using contact location information, wherein the contact is associated with the event and is a person invited to the event or a person who is an inviter for the event;
- determine, from an address book, the contact location information associated with the contact, wherein the contact location information comprises address information for a work address and a home address associated with the contact, the address information being accessible by the calendar application for presenting as a suggested location of the event;
- automatically select, as the suggested location of the event, the work address associated with the contact when an event time of the event lies within specified work hours, and automatically select, as the suggested location of the event, the home address associated with the contact when the event time of the event lies outside the specified work hours; and
- determine the map using the suggested location of the event; and
- a display for displaying the suggested location of the event.

17. The wireless communications device as claimed in claim 16 wherein the processor instructs a radio-frequency transceiver to wirelessly download map data from a map server for displaying a map of the suggested location of the event.

18. The wireless communications device as claimed in claim 16 further comprising a GPS receiver for determining a current location of the device to enable the processor to selectively provide route directions from the current location of the device to the suggested location of the event.

19. The wireless communications device as claimed in claim 16 wherein the processor provides an option to select one of the contacts by enabling display of a plurality of addresses associated with the selected contact and providing an option to select one of the plurality of addresses associated with the contact.

20. The wireless communications device as claimed in claim 16 further comprising a GPS receiver for determining a current location of the device at a time corresponding to the event, the current location of the device being determined to be a current location of the event, the memory and processor associating the current location of the event with any future event having related attributes in order to enable the processor to predict a probable location of any future event having related attributes.

21. The wireless communication device of claim 16 wherein the address information is stored in an address book accessible by the calendar application.

22. The wireless communication device of claim 16 wherein the address information is accessed remotely.

* * * * *